Figure 4:
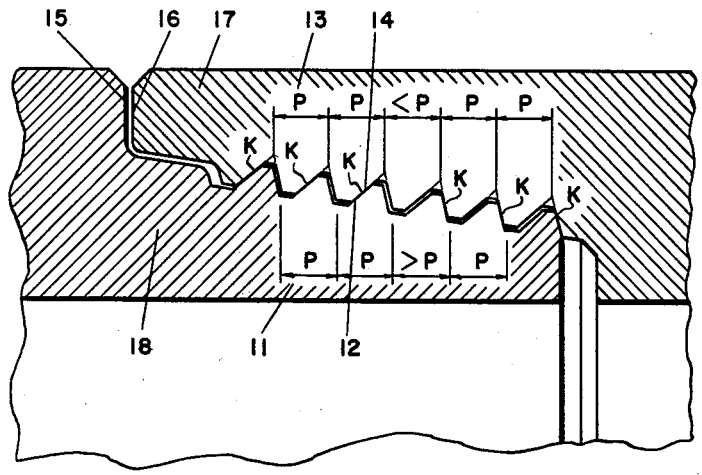
Figure 5:
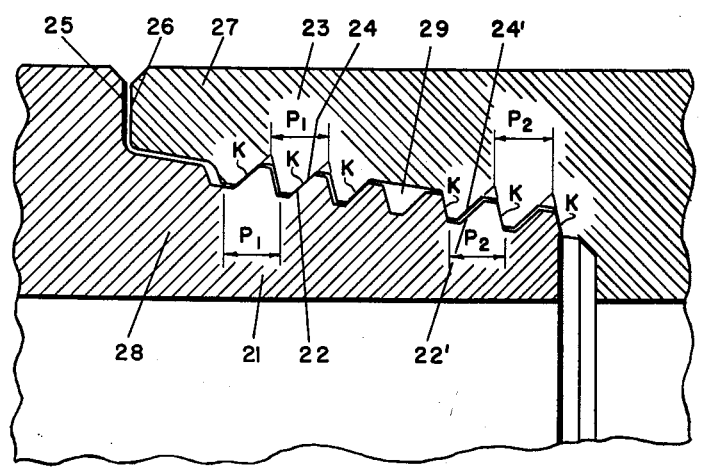

Feb. 26, 1963  H. T. VAN DER WISSEL  3,079,181
BOX-AND-PIN-TYPE THREADED JOINT HAVING DIFFERENT
PITCHES AND PITCH DIAMETERS
Original Filed May 3, 1956  4 Sheets-Sheet 1
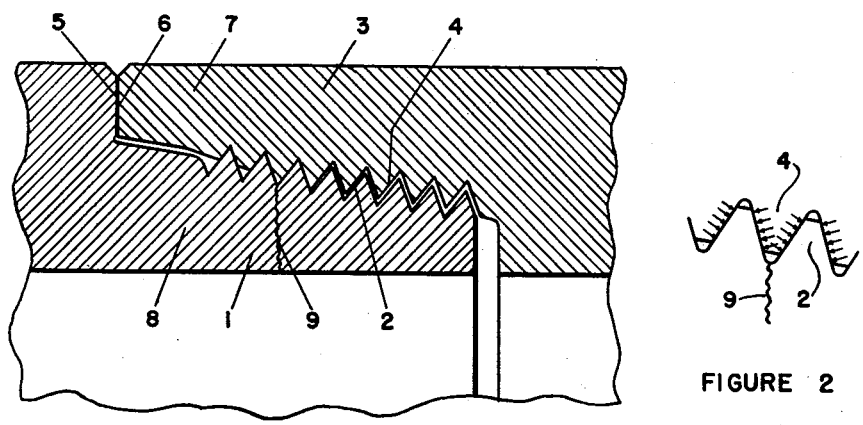
FIGURE 1
FIGURE 2
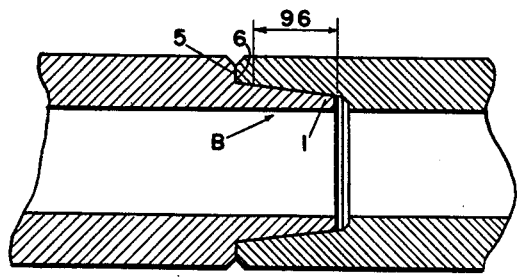
FIGURE 3
INVENTOR: H. T. van der Wissel
BY: A. H. McCarthy
HIS AGENT

# United States Patent Office 3,079,181
Patented Feb. 26, 1963

3,079,181
BOX-AND-PIN-TYPE THREADED JOINT HAVING DIFFERENT PITCHES AND PITCH DIAMETERS
Herman Tobias van der Wissel, The Hague, Netherlands, assignor to Shell Oil Company, a corporation of Delaware
Original application May 3, 1956, Ser. No. 582,357. Divided and this application May 14, 1959, Ser. No. 818,241
Claims priority, application Netherlands Mar. 16, 1954
1 Claim. (Cl. 285—333)

The invention relates to a box-and-pin-type threaded joint particularly suitable in well drilling operations where it can be used for instance as a tool joint, such as a sucker-rod, casing collar, sub, drill collar or drill bit joint.

This application is a division of application Serial No. 582,357, filed May 3, 1956, and now abandoned, which is in turn, a continuation-in-part of application Serial No. 494,479, filed March 15, 1955, and now abandoned.

In this type of joints one of the members to be jointed (the pin) consists of a cylindrical or tapering threaded body, the other member (the box) having a threaded cylindrical or tapering inner surface.

The type of joint recommended by the American Petroleum Institute (A.P.I.) is most generally used. Theoretically, in this joint the taper of the tapering member of the pin is the same as that of the tapering member of the box, and the pitch of the two screw threads is the same. The so-called A.P.I. screw thread has the following drawback:

When screwing the pin into the box in the theoretical case indicated above, screw threads of the pin entirely mate the grooves of the box and, conversely, the space available between the screw threads of the pin is wholly taken up by the box screw threads, indicating that both flanks of each screw thread of the pin as well as of the box are compressed. Thus, a screw thread is wedged into each groove and notching is therefore very liable to occur in the roots of the grooves. The situation becomes still worse when the A.P.I. screw thread is used in joints which have to transmit torque and/or are subjected to bending stress. As will be explained hereinafter, with reference to shouldered connections, when discussing FIG. 1, in these known types of joints very unfavorable stress concentrations occur near the roots of the grooves which are already subjected to heavy strains, so that tearing of the thread and rupture of the pin is not an uncommon feature.

In order to obviate these drawbacks and thus enable a joint to take heavier loads, its dimensions being unchanged, according to the invention either or both screw threads of the joint deviate in such a way from the normal tapering screw thread that, when the pin has been screwed tight into the box, the outer flanks of the pin thread and the inner flanks of the box thread are more heavily loaded than the other flanks. Thus, the threads are substantially equally loaded along the entire thread contact length without plastic deformation, when a connection is screwed power-tight. In the event that both threads of the joint deviate, it is to be understood that they do not deviate in the same way or to the same degree.

By the outer flanks of a screw thread are meant the flanks turned away from the middle of the thread, i.e., the thread surfaces sloping down from the crest of a thread. By normal tapering screw thread is meant a screw thread of which the taper and pitch are the same over the entire length.

The above feature can be obtained in various ways, for instance, by varying the pitch near the middle in either or both screw threads, or by designing the screw thread of the small-diameter end of a tapering pin and the corresponding part of a tapering box with a pitch which is less than that of the screw thread of the large-diameter end of the pin and the corresponding part of the box. It is also possible to select for the pitch of the pin thread a larger value than for the box thread and to make the difference between the pitch diameters of pin and box thread smaller near the middle thereof than at either end. In the latter case the taper of the box along the entire length of the thread may be constant, the taper of the pin at the large-diameter end being smaller and at the thin end being larger than that of the box.

These changes in the pitch of the screw threads or pitch diameters ensure that the box grips around the pin in such a way that, when looking at the joint placed in a horizontal position, only the left flanks of the left half of the screw thread provided on the pin and only the right-hand flanks of the right-hand half of this screw thread are loaded by the screw thread flanks of the box. A wedging effect between the threads and the grooves, with all its detrimental consequences, is thus avoided. The engagement between the threads of the pin and box in this manner puts the pin and the box under compression and tension, respectively, the resulting material stresses comparing favorably with those occurring with the construction previously discussed so that greater loads are permitted, provided the parts are properly designed.

Shrink-type joints are known in which the thread pitch of the box, when cold, is smaller than that of the pin, so that after the box has been heated and allowed to shrink on the pin, the latter is subjected to compression. In this known joint, the two screw threads do not deviate from a normal tapering screw thread which results in the terminal parts of the screw thread being much more heavily loaded than the more central parts. In this joint the outer flanks of the screw thread of the pin and the inner flanks of the screw thread of the box are not more heavily loaded than the other flanks, so there is still a wedging effect.

The invention is described in more detail with reference to the diagrammatical drawing, in which FIG. 1 indicates the known A.P.I. threaded joint, FIG. 2 detail A shown in FIG. 1, FIG. 3 a cross section of a joint according to the invention, FIGURES 4, 5, 6 and 7 are various arrangements of detail B shown in FIG. 3, and FIGURES 8, 9, 10 and 11 show the threaded joint according to the invention as used in various types of joints. Where necessary, the actual proportions have been exaggerated in the drawing for clearness of understanding.

The objet of the figures and their description is only to give some embodiments of the invention; it is to be understood that the application of the invention is not limited to the joints shown in the drawing, but that it may also cover all the threaded joints used in well drilling operations, such as tool joints, casing collars, subs, drill collar joints, drill bit joints, and sucker rod joints. These joints may also be of the shrink type or non-shrink type and may be formed on rods or tubular elements.

The screw thread shown in FIG. 1 is part of the longitudinal section of a joint consisting of a tapering pin member 1 provided with screw thread 2, and a box member 3 having a tapering inside wall provided with screw thread 4. The dimensions of these screw threads are based on A.P.I. specifications. The taper of the box is usually slightly less than that of the pin so as to prevent premature jamming of the small end of the pin with resultant rupture at that place.

Pin and box should be screwed into each other to such an extent that the compressive force between the shoulders 5 and 6 of the pin and box respectively, and the wedging effect between the screw threads is sufficiently large to transfer the torque to be transmitted by the joint. FIGURE 1 shows the relative position of screw threads 2 and 4 when the shoulders 5 and 6 already contact each other.

In FIG. 1 the first three threads of the screw thread are shown as engaged, the others as still disengaged. The pin is screwed down into the box to such an extent that the compression of shoulders 5 and 6 together with the wedging effect of the mating threads provides the force required for transmitting the torque. In the roots of these grooves a wedging effect will easily occur. FIG. 2 shows the forces which screw thread 4 exercises on screw thread 2 (detail A in FIG. 1). With this stress pattern, part 7 of box 3 is subjected to compression, but part 8 of pin 1 is put under tension so that every condition is satisfied for causing rupture of the end of the pin at a specific stress. A fracture 9 is started from the root of one of the first turns of screw thread 2.

According to the present invention, the threaded joint is so constructed as to prevent the occurrence of a wedging effect between the screw threads when screwing the pin into the box, and to permit that a great part of the power to be applied in tightening the joint is used before the shoulders come into contact, in other words a great part of the friction and deformation occurs before the shoulders come into contact.

To this end, in the embodiment according to FIG. 4 (detail B shown in FIG. 3) a local pitch variation is provided near the middle of the screw thread 12 on the pin 11 and near the middle of the screw thread 14 on the box 13, the pitch of the pin thread at this particular point being larger than the normal pitch $p$, and the pitch of the box thread at this particular point being smaller than the normal pitch $p$. This ensures that the outer flanks of the pin screw thread 12 press against the inner flanks of the box screw thread 14, and that as a result thereof the part of the pin 11 which is provided with thread is, apart from radial stresses, subjected to an axial compression stress, whereas an axial tensile stress is set up in the corresponding part of the box 13.

Part 18 of the pin and part 17 of the box are not subjected to axial stress when the shoulders 15 and 16 are not in contact. When, however, the shoulders are loaded (for sealing or torque transmission), these parts (18 and 17) are subjected to axial stress. These shoulder forces, of course, do cause tensile stress in the pin, but not near the roots of the grooves of the thread, as the material there is compressed by the flank pressure, so that these places are safe-guarded against wedging. Consequently the joint according to the invention can be subjected to much higher loads than the conventional conical threaded joint. Further, as according to the invention the flanks over the whole thread length of the joint take parts of the load, the strength of the joint can be further increased by increasing the thread length of the joint.

Although in FIG. 4 local pitch variations are shown in the pin screw thread as well as in the box screw thread, it is also possible and generally preferable for a pitch variation to be provided in only one of the engaging screw threads in such a way that the pin is subjected to an axial compression stress and the box to an axial tensile stress. In the embodiment shown in FIG. 5 the thin end of the pin 21 is provided with a screw thread 22' having the pitch $p_2$, the thick end of the pin being provided with the screw thread 22 having the pitch $p_1$. These screw threads engage with the screw thread 24' and 24 of the box 23 which have the pitch $p_2$ and $p_1$ respectively. By making pitch $p_2$ smaller than pitch $p_1$, the condition shown in FIG. 5 will be obtained when pin 21 is screwed into box 23. As in FIG. 4 the pin is subjected to an axial compression stress, and the box is simultaneously subjected to an axial tensile stress when the pin is screwed into the box.

The manner in which the various pitch variations are obtained is not essential. The screw thread to be provided with a variation can be interrupted at that particular point, as at 29, or continue, it being understood that the variation should be divided over a sufficient length so as to ensure that the stresses caused by tightening of the connection are as uniform as possible on all contacting thread surfaces.

The choice of the flank angles of the screw thread also governs the magnitude and direction of the forces K acting on these flanks; the size of these angles should be adapted to practical requirements.

Figure 6:
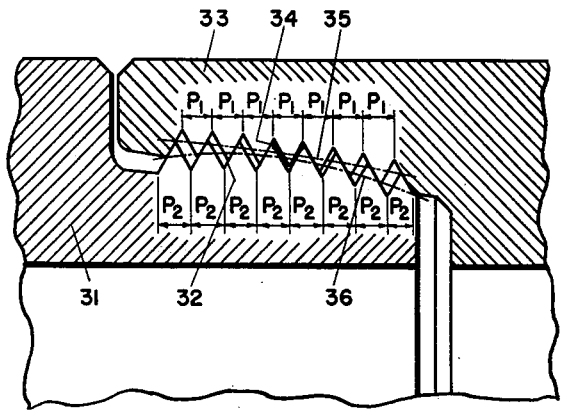

In the threaded joint shown in FIG. 6, the screw thread 32 of the pin 31 has the pitch $p_2$. The screw thread 34 of box 33 is designed with a pitch $p_1$. By designing these screw threads (the pitch $p_2$ being larger than the pitch $p_1$) in such a way that the difference between the pitch diameters 36 and 35 of pin and box thread near the center of the screw threads is smaller than at either end, this design ensures abutment of the outer flanks of the pin screw thread against the inner flanks of the box screw thread when screwing the pin into the box. Owing to the compression during screwing resulting from this contact, the pin is subjected to an axial compression stress and the box axial tensile stress in this type of joint.

Figure 7:
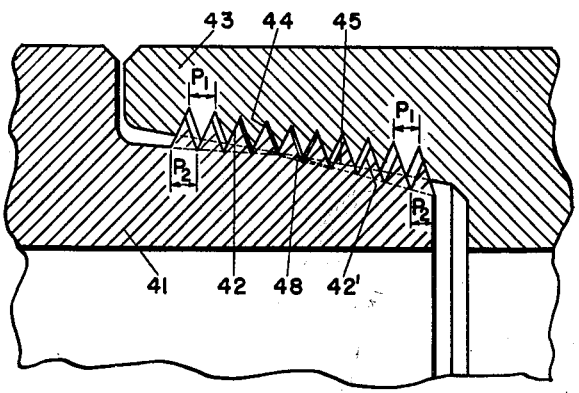

The embodiment shown in FIG. 7 is a modification of the type shown in FIG. 6. Here also the selected pitch $p_2$ of the pin screw thread is greater than pitch $p_1$ of the box screw thread. Starting from the box pitch line 45, which instead of being curved, such as line 35 in FIG. 6, is chosen straight, the taper of the screw thread 44 arranged in the box will remain constant throughout the length of the screw thread. In order to ensure that the outer flanks of the pin screw thread are forced against the inner flanks of the box screw thread when screwing the pin into the box, the pin screw thread should be divided into two parts 42 and 42' having tapers which differ from each other and also from the taper of the box screw thread so that the difference between the pitch diameters of pin and box screw thread near the center thereof is smaller than at either end thereof.

To ensure a uniform loading of the flanks, whereby galling is prevented, the transition between the two tapering parts of the pin at the particular point is designed to take place more or less gradually instead of abruptly (see zone 48 in FIG. 7); in that case the pitch lines of pin and box are, even in the middle, far enough apart to prevent galling.

It is also possible to keep the taper of the pin constant throughout the length of the pin and construct the inside of the box with two parts with different tapers in such a way that the taper of the part situated near the box end is larger and the taper of the part situated near the inside of the box is smaller than that of the pin. Also in this case the pitch lines of pin and box should be kept far enough apart.

The pitch $p_2$ of the pin screw thread can be made to vary for the two parts of the pin; it may, for instance, for the left part of the pin, be equal to the box screw thread pitch $p_1$ (FIG. 7).

In the screw-type joints according to the invention, the flank slits between the inner flanks of the pin and the outer flanks of the box in stressless state (i.e., in hand-tight position, that is before the pin is screwed tight into the box) in general increase in size from the middle of the threaded joint to either end, while the flank slits between the outer flanks of the pin and the inner flanks of the box decrease in size from the middle of the threaded joint towards either end. It will be understood that the constructional features of the threaded joints shown in FIGURES 6 and 7 can be combined with each other and with those of the joints shown in FIGURES 4 and 5 to obtain the desired result. Threaded joints according to the invention are indicated generally by 96 in FIGURES 3, 8, 9, 10 and 11.

Figure 8:
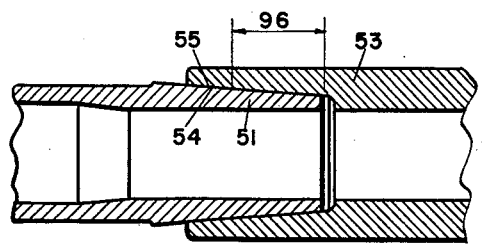
Figure 9:
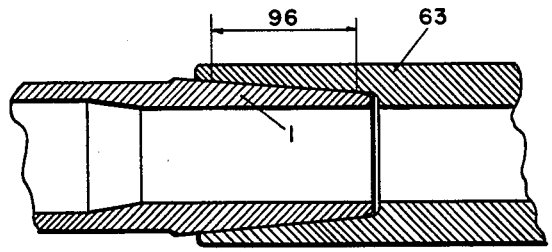
Figure 10:
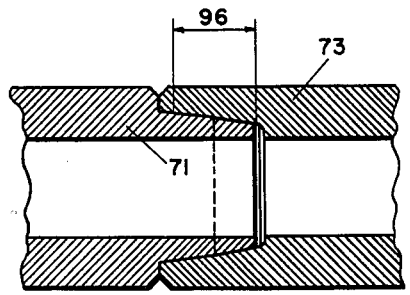
Figure 11:
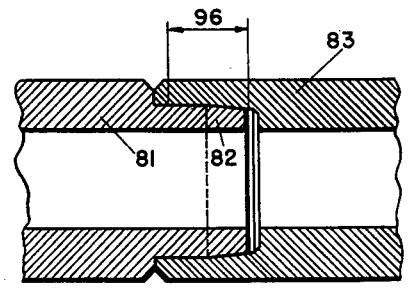

A sealing as obtained in FIG. 3 by the shoulders 5 and 6 arranged at right anges to the axis of the joint, is obtained in FIG. 8 by the tapering faces 53 and 54.

Good results were also obtained in coupling the threaded joint 96 (see FIG. 9) by preheating the entire box 63. After the pin has been screwed into the box, the latter is allowed to cool. Owing to the decrease in length of the box which is cooling down the pressure between the engaging flanks of the two screw threads will increase, thus setting up, apart from radial stresses, an axial tensile stress in the box and an axial compression stress in the pin, the screw thread being substantially equally loaded at all parts. In most shrink-type joints there are radial stresses only, except in case of a joint where the thread pitch of the box is less than that of the pin resulting in the outer grooves being much more heavily loaded than the grooves situated more towards the middle.

With the shrink-type joint according to the invention the sealing according to FIG. 8 may be used with advantage.

Both the pin and box may consist of two abutting tapering parts 71 and 73 (see FIG. 10), the taper of the part near the end being larger than that of the other parts situated on the pin. The latter taper may also be nil (see FIG. 11), in which case the pin comprises two parts, a cylindrical part 81 and a tapering part 82 abutting thereto, the inside of the box 83 being also partly cylindrical and partly tapering. The first type of construction has the advantage that the pin can be screwed more rapidly into the box, whereas the construction with the cylindrical part enables the use of a thicker pin.

If the screw thread is interrupted at the place of the pitch variation, fewer turns will be required for screwing down; before the pin is screwed into the box it is inserted farther into the box than when the screw threads are not interrupted. This construction may also be advantageous in cutting the thread.

As a result of the stress distribution obtained according to the invention in the box and pin, wobbling of the joint is prevented.

When using the screw thread according to the invention in casing, this casing can be pulled out of the formation without the risk of being disconnected on account of the screw threads being drawn over each other.

While shoulders 5 and 6 in FIGURES 4 to 7 have been shown with a space between them, they may be in contact with each other, e.g. to provide additional sealing or to be stronger against bending stresses.

*Test Results*

A tapering pin-and-box-type threaded joint according to A.P.I. specification was compared with a similar joint according to the invention. Both joints were made from the same quality of steel, the treatment of the steel having been the same in both cases. In both tests the same grease was used and the two joints were tested in the same manner with respect to loading conditions and temperature.

Differences between the two threads appear from the following table.

|  | Normal A.P.I. joint | Joint according to the invention |
| --- | --- | --- |
| Pitch of box_____mm____ | 6.35 | 6.35 |
| Pitch of pin_____mm____ | 6.35 | 6.374 |
| Taper of pin at shoulder end_____ | 1:6 | 1:6.55 |
| Taper of pin at center_____ | 1:6 | 1:6 |
| Taper of pin at small end_____ | 1:6 | 1:5.57 |
| Taper of box_____ | 1:6 | 1:6 |
| Stand-off (distance between shoulders in hand-tight position)_____mm____ | 0 | 1.5 |

The two joints were gradually loaded (overloaded) with 3340 kgm., which resulted in the following permanent changes of dimensions:

|  | Normal A.P.I. joint | Joint according to the invention |
| --- | --- | --- |
| Increase of outside diameter of shoulder of box_____mm____ | 8.05 | 1.24 |
| Increase of pitch of pin_____mm____ | 0.66-0.78 | 0.05-0.06 |
| Decrease of inside diameter of pin at 50 mm. from small end_____mm____ | 0.92 | 0.43 |

(The increase in pitch of the pin according to the invention was due to the extreme overloading condition.)

A joint according to the invention with a thread length of 5" (1" larger than the standard length), which resulted in a smaller shoulder area, was loaded (overloaded) with 4000 kgm. The increase in outside diameter of the shoulder of the box was then 3.69 mm., but the increase in pitch of the pin was found to be between —0.005 (decrease) and +0.015 mm., which is less than the tolerance of the thread.

Further a great number of bending tests have been made with small models. In these tests it was found that the joint according to the invention could be loaded by about 50% more than the A.P.I. joint, whereas, at the same load, the joint according to the invention could stand a much larger number of loadings than the standard joint.

I claim as my invention:

In a screw-threaded joint for equipment comprising elongated cylindrical members to be joined together coaxially, a box having a tapered screw-threaded portion formed on one of said members, a pin having a tapered screw-threaded portion formed on another of said members, the screw threads on said box and those on said pin being of substantially uniform cross section throughout their length, said screw-threaded portions being formed with the pitch of the thread on the pin larger than the pitch of the thread in the box and with the difference between the pitch diameters of the screw threads near the middle of pin and box screw-threaded portions being smaller than the differences at either end thereof, so that in a longitudinal cross-sectional view of the joint when the tightly coupled joint is in a horizontal position, with the larger-diameter portion of the pin at the left, the left flanks of the threads on the larger-diameter portion of the tapered pin and the right flanks of the threads on the small-diameter portion of the tapered pin engage the screw-thread flanks of the box with significantly greater force than the other flanks of the pin, the difference in pitch diameters being such that substantially all of the respective left and right flanks are in loaded engagement and whereby the threaded portion of the pin is subjected to an axial compressive force and the adjacent portion of the box to an axial tensile stress.

(References on following page)

References Cited in the file of this patent

UNITED STATES PATENTS

| | | |
|---|---|---|
| 1,817,808 | Eaton | Aug. 4, 1931 |
| 1,909,489 | Eaton | May 16, 1933 |
| 2,345,725 | Bettis | Apr. 4, 1944 |
| 2,360,826 | Cherry | Oct. 24, 1944 |
| 2,870,668 | Flahout | Jan. 27, 1959 |

FOREIGN PATENTS

| | | |
|---|---|---|
| 569,581 | Great Britain | May 30, 1945 |